(12) United States Patent
Vandergheynst et al.

(10) Patent No.: US 7,070,717 B2
(45) Date of Patent: Jul. 4, 2006

(54) MOX FUEL FABRICATION PROCESS FROM WEAPON PLUTONIUM FEED

(75) Inventors: Alain Vandergheynst, Dour (BE); Eduard Pelckmans, Kasterlee (BE); Marc De Vleeschauwer, Dessel (BE)

(73) Assignee: Belgonucleaire SA, Brussels (BE)

( * ) Notice: Subject to any disclaimer, the term of this patent is extended or adjusted under 35 U.S.C. 154(b) by 135 days.

(21) Appl. No.: 10/505,428

(22) PCT Filed: Mar. 11, 2002

(86) PCT No.: PCT/BE02/00030

§ 371 (c)(1),
(2), (4) Date: Aug. 24, 2004

(87) PCT Pub. No.: WO03/077262

PCT Pub. Date: Sep. 18, 2003

(65) Prior Publication Data

US 2005/0167861 A1   Aug. 4, 2005

(51) Int. Cl.
*G21C 21/02*   (2006.01)

(52) U.S. Cl. ................................ 264/0.5; 252/643
(58) Field of Classification Search ............... None
See application file for complete search history.

(56) References Cited

U.S. PATENT DOCUMENTS

| | | | | |
|---|---|---|---|---|
| 5,932,930 A | * | 8/1999 | Wadekamper et al. | 264/0.5 |
| 5,978,431 A | * | 11/1999 | Edwards | 376/261 |
| 6,235,223 B1 | * | 5/2001 | Doerr et al. | 264/0.5 |
| 6,251,310 B1 | * | 6/2001 | Song et al. | 264/0.5 |
| 6,764,618 B1 | * | 7/2004 | Vandergheynst et al. | 264/0.5 |
| 6,783,706 B1 | * | 8/2004 | Vandergheynst et al. | 264/0.5 |
| 2004/0201003 A1 | * | 10/2004 | Gotta et al. | 252/643 |

FOREIGN PATENT DOCUMENTS

WO   WO 00 45394 A1   8/2000
WO   WO 01 03143 A1   1/2001

* cited by examiner

*Primary Examiner*—Mary Lynn Theisen
(74) *Attorney, Agent, or Firm*—Sughrue Mion, PLLC

(57) ABSTRACT

Process for fabrication MOX fuel from weapon originating plutonium oxide (W—$PuO_2$), including a process for fabricating MOX fuel pellets, a dry processing of W—$PuO_2$ powder, and a dry processing of MOX fabrication scrap.

9 Claims, 2 Drawing Sheets

MOX FUEL FABRICATION PROCESS FROM WEAPON PLUTONIUM FEED

Figure 1:
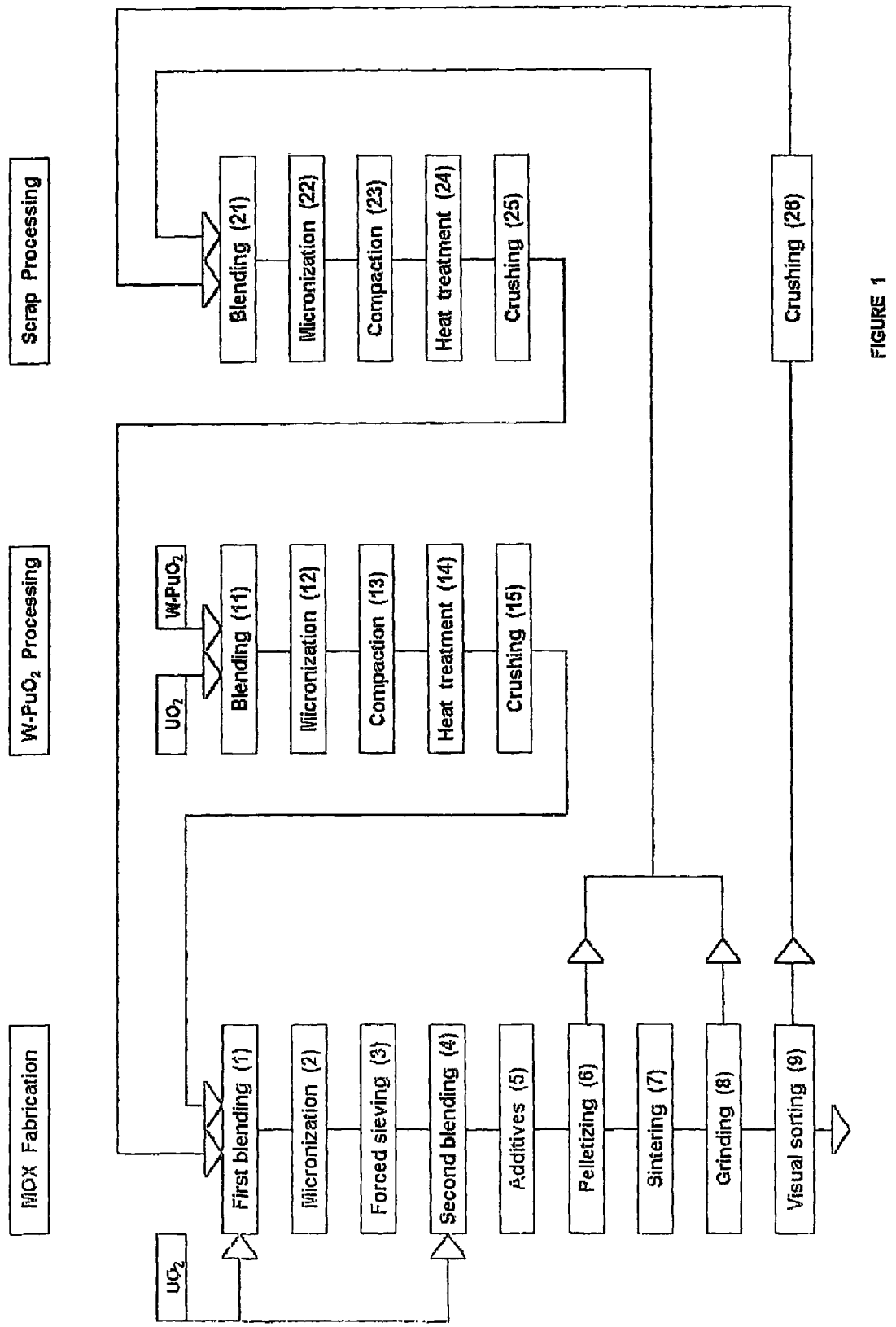

The present invention relates to a processing for fabricating (U,Pu) mixed oxide nuclear fuel (MOX) from weapon grade plutonium (W—Pu hereinafter) alloyed with gallium.

This process may be used in implementing non-proliferation programs by disposing of excess weapon plutonium stockpiles. Several methods of disposing of those stockpiles are considered as plutonium immobilization in conditions that prevent its future retrieval and fabrication and irradiation of MOX fuel produced from this plutonium.

Some processes for manufacturing MOX fuel have been developed during the last decades, some calling for the complete milling of $UO_2$ and $PuO_2$ powder feeds in order to provide an intimate mixture, others being characterized by the milling of only a part of these powders.

The MIMAS (Micronization and MASter blend) process that has been created and developed by the applicant of the present invention carries out the micronization by milling only a part of the final blend and makes use of two blending steps to reach the required plutonium content in the final product and to allow the isotopic homogenization of the plutonium oxide.

The features of this process are described in the international patent application PCT/BE99/00012 (WO 00/45394).

W—Pu generally contains specific alloying elements that are not desirable in said fabricated nuclear fuel and are therefore considered as impurities by the MOX fuel users. This plutonium is mostly alloyed with gallium in order to stabilize the δ phase of the plutonium metal but may also contain other impurities. Because the gallium is considered as an impurity that may cause clad corrosion of the fabricated MOX fuel, the designers require that the gallium content be reduced down to about a ten w-ppb (weight part per billion) level.

Wet as well as dry processes may be considered for removal of gallium and/or other impurities.

The following patents address the separation of plutonium and gallium

U.S. Pat. No. 6,187,163: method for plutonium separation by anodic dissolution of a solid plutonium-gallium alloy, RU-A-2131477: method of processing armament plutonium, U.S. Pat. No. 3,417,002: method and apparatus for improving recovery of plutonium-gallium alloys by electrorefining.

Some of these patents are dealing with wet processes.

The wet processes for gallium removal have major drawbacks. They generate large amounts of liquid waste, they involve supplementary criticality risks versus a dry MOX fuel fabrication, they need the installation of specific process systems, they require supplementary packaging equipment and transport operations when said specific process systems are installed neither in the facility for converting the plutonium into oxide nor in the MOX fuel fabrication plant.

Dry processes for gallium removal have been addressed during the last years by several organizations. They experimented a dry process consisting of a heat treatment of the W—Pu oxide. A heat treatment called Thermal Induced Gallium Removal (TIGR) and developed by LANL (Los Alamos National Laboratory, Los Alamos, N. Mex. USA) processes plutonium oxide powder at about 1,200° C. having a particle size large enough to avoid entrainment by the gas stream in the heat treatment furnace. The same organization has fabricated MOX fuel from W—Pu oxide with and without preliminary gallium removal treatment. Another dry process for gallium removal developed by ANRCP (Amarillo National Resource Center for Plutonium, Amarillo, Tex. USA) operates at high temperature and leads to trap the removed gallium by getters. These processes, performed either with or without preliminary gallium removal treatment have lead to reported gallium removal performances that do not however allow to meet said required values.

The gallium exists within the plutonium oxide feed as solid gallium trioxide ($Ga_2O_3$) obtained while oxidizing the plutonium metal to form the plutonium oxide ($PuO_2$). The reduction of $Ga_2O_3$ by a reducing gas (f.i. $H_2$) into the volatile suboxide of gallium ($Ga_2O$) and the removal of $Ga_2O$ are based on various mechanisms combining gas diffusion into solids, oxido-reduction, gas migration and convective mass transfer. The chemical equation for gallium trioxide reduction is:

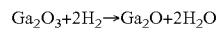

$$Ga_2O_3 + 2H_2 \rightarrow Ga_2O + 2H_2O$$

According to the present invention, the fabrication process that avoid the above mentioned drawbacks comprises:

a process for fabricating MOX fuel pellets including:
- a first blending of dry processed W—$PuO_2$ with dry processed MOX scrap and possibly uranium oxide powder,
- a micronization and a forced sieving of this first blend,
- a second blending and a mixing of the micronized and sieved first blend with uranium oxide powder,
- an additive addition and a pelletizing of this mixed second blend,
- a sintering of the resulting pellets, and a dry processing of W—$PuO_2$ powder including:
- a blending of the W—$PuO_2$ powder with one or the other or both following materials: uranium oxide powder and/or dry processed MOX scrap,
- a micronization of this blend,
- a compaction of this micronized blend into tablets,
- a heat treatment in reducing atmosphere of these tablets that are meant, after mechanical preparation, to be mixed into the first blending used in the above mentioned MOX fuel pellet fabrication, and a dry processing of MOX fabrication scrap including:
- a blending of MOX scrap powder or crushed MOX scrap pellets, with uncontrolled impurity content, uncontrolled granulometry or uncontrolled sinterability,
- a micronization of this blend,
- a compaction of this micronized blend into tablets,
- a heat treatment in reducing atmosphere of these tablets that are meant, after mechanical preparation, to be mixed into said first blending used in MOX fuel pellet fabrication.

The gallium removal process steps comprise only process steps that are currently used in the MOX fuel fabrication industry and, particularly, in the resulting scrap recycling. Because a same process step sequence may be used for both gallium removal and scrap recycling, the latter can be implemented in one single process step sequence and performed in the same process equipment. As a result, neither specific nor supplementary gallium removal process steps nor related equipment are necessary, what constitutes a major advantage versus existing gallium removal processes.

The blend of W—Pu oxide with uranium oxide powder and/or MOX scrap leads to such dilution that batches containing significant amounts of W—Pu may be used without unacceptable criticality risks.

The micronization step during process leads to particle size reduction and hence limits the time required for gallium migration inside the particle. The compaction operation at reduced pressure agglomerates the particles in tablets that are large enough to avoid entrainment by the gas stream in the heat treatment furnace while being porous enough to allow the reducing gas diffusion inside the tablets and the removal of the gallium suboxide by this gas flow.

Other details and particular features of the invention emerge from the attached claims and from the description below.

FIG. 1 schematically shows the MOX fabrication steps (left branch), those of the W—PuO$_2$ processing steps (middle branch) and those of the MOX scrap processing steps (right branch).

Figure 2:
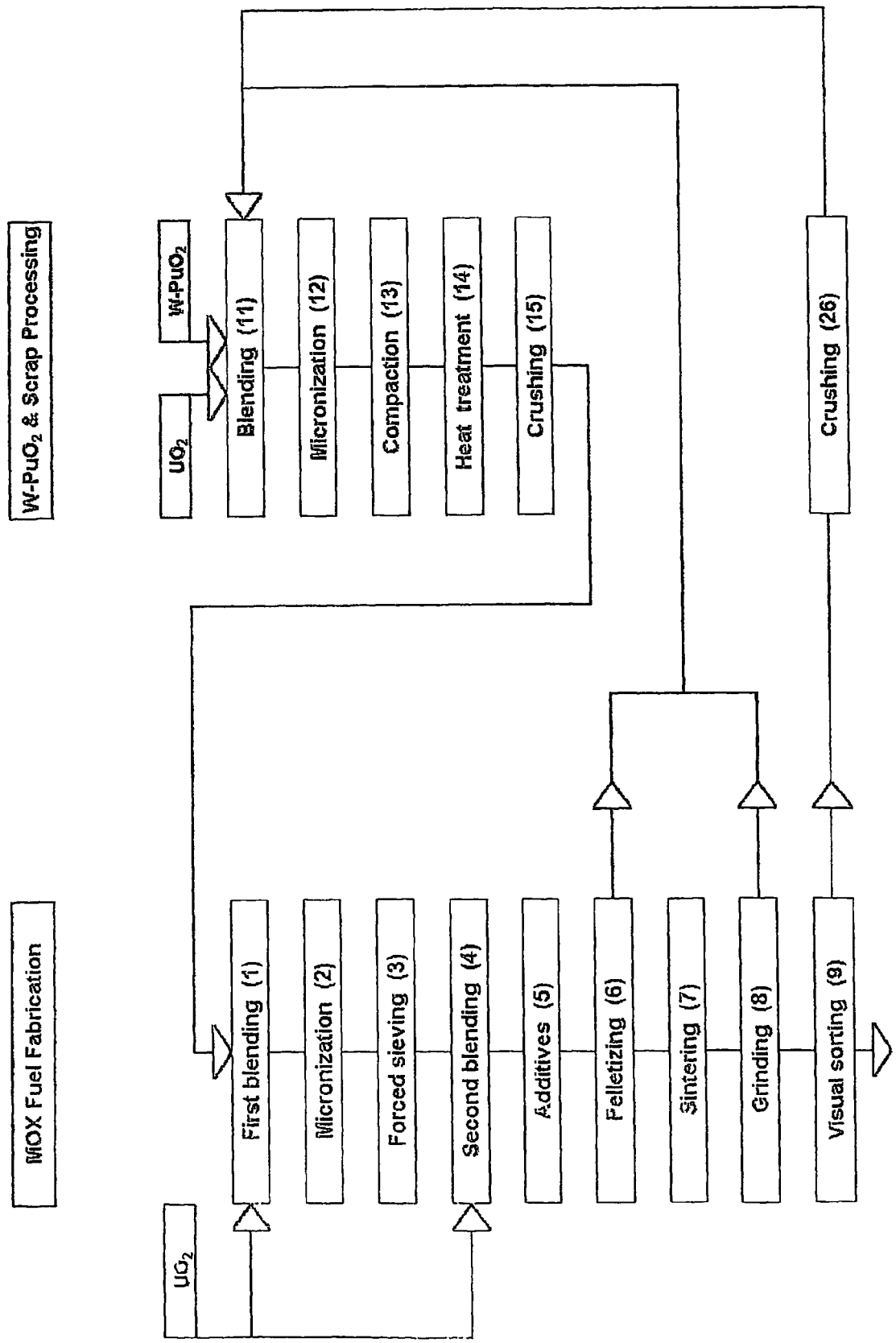

FIG. 2 shows the combination of the W—PuO$_2$ processing steps with the MOX scrap processing steps (right branch) and their relation with the fuel MOX fabrication steps (left branch).

In the figures, same references indicate same or similar elements.

More details about the various steps of FIG. 1 are given below.

The process of the invention for MOX fuel fabrication from W—Pu feed comprises basically a process for fabricating (U,Pu)O$_2$ mixed oxide fuel pellets i.e.:

first blending (step 1) of W—PuO$_2$ powder and/or UO$_2$ powder and/or MOX fabrication scrap, micronization (step 2) of this first blend, particularly by ball milling and forced sieving (step 3) for example through a 250µ mesh, second blending (step 4) of the first blend with UO$_2$ powder and possibly MOX fabrication scrap, addition and blending of lubricant and/or pore former (step 5), this step being possibly combined with the previous one, compressing (step 6) of the second blend into pellets in pelletizing presses, sintering (step 7) of said pellets preferably in an atmosphere of moistened mixture of hydrogen and carrier gas (argon or nitrogen), dry grinding of the pellets (step 8), pellet visual sorting (step 9).

The manufacturing process may also include the steps formed by:

stacking up to length, loading of the pellets into a cladding, welding of an end plug to from a fuel rod, pressurizing of the rod, testing of the rod, bundling of several rods to form a fuel assembly, testing of the fuel assembly.

Pellets rejected at step 9 of visual sorting may be crushed in step 26 and add to a blending step 11 or 21 to be described.

The process of the invention also includes a preliminary processing of the W—Pu oxide. This processing includes:

blending (step 11) of W—PuO$_2$ powder and UO$_2$ powder, micronization (step 12) of this blend, particularly by ball milling, compressing (step 13) of the micronized blend into tablets in compacting or pelletizing presses, heat treatment (step 14) of said tablets preferably in an atmosphere of hydrogen and carrier gas (argon or nitrogen), possibly in a furnace with tungsten heating resistances, crushing of the heat treated tablets (step 15) f.i. in a jaw crusher.

The process of the invention further includes a preliminary processing of the MOX fabrication scrap. This processing includes:

blending (step 21) of MOX scrap powder and/or crushed MOX scrap pellets, micronization (step 22) of this blend, particularly by ball milling, compressing (step 23) of the micronized blend into tablets in compacting or pelletizing presses, heat treatment (step 24) of said tablets preferably in an atmosphere of hydrogen and carrier gas (argon or nitrogen), crushing of the heat treated tablets (step 25) f.i. in a jaw crusher.

More details about the combination of the W—PuO$_2$ processing steps with the MOX scrap processing steps of FIG. 2 are given below.

The process of the invention also includes a preliminary processing of the W—Pu oxide and of the MOX fabrication scrap. This processing includes:

blending (step 11) of W—PuO$_2$ powder blended with MOX fabrication scrap and, possibly UO$_2$ powder, micronization (step 12) of this blend, particularly by ball milling, compressing (step 13) of the micronized blend into tablets in compacting or pelletizing presses, heat treatment (step 14) of said tablets preferably in an atmosphere of hydrogen and carrier gas (argon or nitrogen), possibly in a furnace with tungsten heating resistances, crushing of the heat treated tablets (step 15) f.i. in a jaw crusher.

Powder MOX scrap is coming from various fabrication steps: excess powder left at batches tail, grinding dust, powder recovered from dust filters, etc., while MOX scrap pellets originate from sample pellets, discarded pellets, fabrication excess, etc.

Some non-limiting parameters of the MOX fuel fabrication process using W—Pu oxide are given hereafter.

the fuel fabrication is performed in batches. This enables to use the same equipment for fuel fabrication and for processing of the W—Pu oxide and of the MOX scrap, the plutonium content of the first blending is 20 to 30%. The W—Pu oxide is blended either with MOX scrap or with uranium oxide or both materials. The scrap amount that may be incorporated in this first blending may reach 65%, the second blending is obtained by addition of free flowing uranium oxide to the first blend after its micronization and sieving to 250µ mesh, the MOX fuel pelletizing pressures range between 400 and 600 MPa and 0.2 to 0.5% lubricant are added into the blend to be pelletized, the MOX fuel sintering is performed at temperatures ranging between 1,650 and 1,760° C. for a minimum of 4 hours under reducing atmosphere (hydrogen mixed with a carrier gas f.i. Ar or N$_2$) moistened to get a H$_2$/H$_2$O ratio between 15 and 30, the weapon origin plutonium oxide may be processed alone—after dilution by uranium oxide—or blended with MOX scrap or both, the compaction of blends of W—Pu oxide with MOX scrap is performed under pressures between 100 and 200 MPa and 0.2 to 0.3% lubricant is added into the blend to be pressed, the heat treatment of tablets made from blends of W—Pu oxide with MOX scrap and/or uranium oxide is performed at temperatures above 1,600° C. for a minimum of 4 hours under reducing atmosphere with H$_2$/H$_2$O ratio as used during MOX fuel sintering or higher to enhance gallium removal.

In order to reduce the equipment investment costs, one may use the main fuel fabrication equipment to preform the pretreatment of blends of W—Pu oxide with MOX scrap: mills, mixers, compaction presses, sintering furnaces. Operation parameters for pretreatment may be identical or different from those used in MOX fuel fabrication.

It must be understood that the present invention is in no way limited to the embodiments described above and that many modifications may be carried out thereon without departing from the scope of the claims presented below.

Other MOX fuel fabrication processes exist and may benefit from the present invention.

The above referenced figures are based on the MIMAS process developed by the applicant of the present invention. Details of other fabrication processes that are mainly characterized by the complete milling of $UO_2$ and $PuO_2$ powders and by the combination of the two blending steps in a single one may easily be deducted from the above figures.

The invention claimed is:

1. Process for fabricating mixed oxide $(U,Pu)O_2$ nuclear fuel from weapon originating plutonium oxide (W—$PuO_2$), including:
   a process for fabricating MOX fuel pellets including:
      a first blending (1) of dry processed W—$PuO_2$ with dry processed MOX scrap and possibly uranium oxide powder,
      a micronization (2) and a forced sieving (3) of this first blend,
      a second blending and a mixing (4) of the micronized and sieved first blend with uranium oxide powder,
      an additive addition (5) and a pelletizing (6) of this mixed second blend,
      a sintering (7) of the resulting pellets, and
   a dry processing of W—$PuO_2$ powder including:
      a blending (11) of the W—$PuO_2$ powder with one or the other or both following materials: uranium oxide powder and/or dry processed MOX scrap,
      a micronization (12) of this blend,
      a compaction (13) of this micronized blend into tablets,
      a heat treatment (14) in reducing atmosphere of these tablets that are meant, after mechanical preparation (15), to be mixed into the first blending used in the above mentioned MOX fuel pellet fabrication, and
   a dry processing of MOX fabrication scrap including:
      a blending (21) of MOX scrap powder or crushed MOX scrap pellets, with uncontrolled impurity content, uncontrolled granulometry or uncontrolled sinterability,
      a micronization (22) of this blend,
      a compaction (23) of this micronized blend into tablets,
      a heat treatment (24) in reducing atmosphere of these tablets that are meant, after mechanical preparation (15), to be mixed into said first blending used in the MOX fuel pellet fabrication.

2. Process as claimed in claim 1 wherein the first and second blending steps for fabricating MOX fuel pellets are combined in a single milling operation and wherein the blend is completely micronized.

3. Process as claimed in claim 1 wherein the dry processing of the W—Pu oxide and the dry processing of the MOX fabrication scrap are combined in a single sequence of process steps.

4. Process as claimed in claim 1, wherein gallium removal is obtained by a combination of the heat treatment (14) of W—$PuO_2$ and of a sintering process (7), the sintering parameters being selected in order to enhance said gallium removal.

5. Process as claimed in claim 1, wherein the heat treatment (14) of the W—$PuO_2$ tablets is performed at least at 1,600° C. in reducing atmosphere, more particularly in a furnace with tungsten heating resistances.

6. Process as claimed in claim 1, wherein is included in addition a crushing of the W—$PuO_2$ tablets and/or of the MOX scrap tablets before their micronization.

7. Process as claimed in claim 1, characterized by the use of a ball mill for the powder micronization in at least one of the micronization steps (2, 12, 22).

8. Process as claimed in claim 1, characterized by lubricant addition before the pelletizing or compaction in at least one of the pressing steps (6, 13, 23).

9. Process as claimed in claim 1, characterized by the use of MOX fuel fabrication equipment for processing W—$PuO_2$ and MOX scrap material.

* * * * *